(12) United States Patent
Sakiyama et al.

(10) Patent No.: US 12,358,328 B2
(45) Date of Patent: Jul. 15, 2025

(54) RUN FLAT TIRE

(71) Applicant: BRIDGESTONE CORPORATION, Tokyo (JP)

(72) Inventors: Tomotaka Sakiyama, Tokyo (JP); Takeshi Iwatani, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/547,200

(22) PCT Filed: Nov. 5, 2021

(86) PCT No.: PCT/JP2021/040884
§ 371 (c)(1),
(2) Date: Aug. 21, 2023

(87) PCT Pub. No.: WO2022/208971
PCT Pub. Date: Oct. 6, 2022

(65) Prior Publication Data
US 2024/0166000 A1      May 23, 2024

(30) Foreign Application Priority Data
Mar. 31, 2021   (JP) ................. 2021-062037

(51) Int. Cl.
*B60C 17/00*   (2006.01)
*B60C 17/08*   (2006.01)

(52) U.S. Cl.
CPC .. *B60C 17/0027* (2013.01); *B60C 2017/0063* (2013.01); *B60C 2017/0072* (2013.01)

(58) Field of Classification Search
CPC ............ B60C 17/0009; B60C 17/0018; B60C 17/0027; B60C 17/0036; B60C 17/0045; B60C 2017/0054; B60C 2017/0063; B60C 2017/0072; B60C 17/00
See application file for complete search history.

(56) References Cited

U.S. PATENT DOCUMENTS

| | | | |
|---|---|---|---|
| 4,779,658 A | 10/1988 | Kawabata et al. | |
| 6,237,661 B1 | 5/2001 | Asano | |
| 9,090,129 B2 | 7/2015 | Horiuchi | |
| 9,290,064 B2 | 3/2016 | Horiuchi | |
| 9,796,214 B2 * | 10/2017 | Adachi | ............ B60C 5/142 |

(Continued)

FOREIGN PATENT DOCUMENTS

| | | | |
|---|---|---|---|
| DE | 102008025037 A1 * | 11/2009 | ......... B60C 17/0009 |
| DE | 102018215196 A1 | 3/2020 | |

(Continued)

OTHER PUBLICATIONS

Machine translation of DE 102008025037, 2009.*

(Continued)

*Primary Examiner* — Justin R Fischer
(74) *Attorney, Agent, or Firm* — KENJA IP LAW PC

(57) ABSTRACT

The tire maximum width in the reference condition is the center value or more and the upper limit or less of the tire maximum width specified in the standard, and the tire maximum width position in the reference condition is located at the position, with a distance of more than 50% of the tire cross-sectional height, outward in the tire radial direction from the bead baseline.

13 Claims, 2 Drawing Sheets

(56) References Cited

U.S. PATENT DOCUMENTS

2007/0062627 A1    3/2007  Wagner
2013/0199688 A1 *  8/2013  Nakazaki ............. B60C 17/00
                                                       152/517
2013/0248072 A1    9/2013  Horiuchi

FOREIGN PATENT DOCUMENTS

| EP | 2786881  | B1 | * | 6/2018  | ......... B60C 17/0018 |
| EP | 3366496  | A1 |   | 8/2018  |                        |
| JP | S62279107 | A |   | 12/1987 |                        |
| JP | H01278806 | A |   | 11/1989 |                        |
| JP | 2000108618 | A |  | 4/2000  |                        |
| JP | 2001138721 | A |  | 5/2001  |                        |
| JP | 2004074914 | A |  | 3/2004  |                        |
| JP | 2007505783 | A |  | 3/2007  |                        |
| JP | 2007261546 | A | * | 10/2007 |                       |
| JP | 2008155672 | A |  | 7/2008  |                        |
| JP | 2009126410 | A |  | 6/2009  |                        |
| JP | 2011184000 | A |  | 9/2011  |                        |
| JP | 2013071672 | A |  | 4/2013  |                        |
| JP | 2013199155 | A |  | 10/2013 |                        |
| JP | 2015016765 | A |  | 1/2015  |                        |
| JP | 2015214306 | A |  | 12/2015 |                        |
| KR | 102070917 | B1 |  | 1/2020  |                        |

OTHER PUBLICATIONS

Machine translation of JP 2007-261546, 2007.*

Dec. 28, 2021, International Search Report issued in the International Patent Application No. PCT/JP2021/040884.

Oct. 3, 2023, International Preliminary Report on Patentability issued in the International Patent Application No. PCT/JP2021/040884.

Aug. 27, 2024, search result of the Extended European Search Report issued by the European Patent Office in the corresponding European Patent Application No. 21935127.7.

* cited by examiner

RUN FLAT TIRE

TECHNICAL FIELD

This disclosure relates to a run flat tire.

BACKGROUND

As an inflated tire, a run flat tire comprising a side-reinforcing rubber having a crescent-shaped cross section in the sidewall portion is known (e.g., PTL1). According to such a run flat tire, even if, for example, the tire is punctured and the internal pressure drops, the side-reinforcing rubber can carry the load instead for a considerable distance.

CITATION LIST

Patent Literature

PTL 1: 2011/184000 A1

SUMMARY

Technical Problem

While the run flat tire is required to have high durability in run flat driving conditions, the side-reinforcing rubber causes a decrease in ride comfort due to an increase in the vertical spring coefficient.

It is therefore an object of this disclosure to provide a run flat tire with run flat durability, while reducing the deterioration in ride comfort.

Solution to Problem

The gist structure of this disclosure is as follows:
(1) A run flat tire comprising:
  a tread portion;
  a pair of sidewall portions connected to both sides of the tread portion;
  bead portions connected to each of the sidewall portions;
  a side-reinforcing rubber having a crescent-shaped cross section disposed in the sidewall portion; and
  a carcass straddling toroidally between a pair of the bead portions; wherein,
  a part of the side-reinforcing rubber is a low elastic portion with a lower elastic modulus than other portion,
  the low elastic portion is located in an area, in the tire radial direction, of 50% or more and 80% or less of the tire cross-sectional height from the bead baseline, in a reference condition with the run flat tire mounted on an applicable rim, filled with prescribed internal pressure, and unloaded,
  an elastic modulus of the low elastic portion is 80% or less of an elastic modulus of the other portion,
  when the maximum thickness of the low elastic portion, measured in the direction of a perpendicular line from the carcass down to the tire inner surface, is t1 and the thickness of the other portion, measured in the direction of the perpendicular line, is t2, the ratio t1/t2 is 0.2 or more and 3 or less,
  the tire maximum width in the reference condition is the center value or more and the upper limit or less of the tire maximum width specified in the standard, and
  the tire maximum width position in the reference condition is located at the position, with a distance of more than 50% of the tire cross-sectional height, outward in the tire radial direction from the bead baseline.

The term "elastic modulus" shall mean the tensile modulus when the vulcanized rubber is processed into dumbbell-shaped No. 8 specimens and elongated by 25% at a measurement temperature of 25° C., based on the tensile modulus at 25% elongation at 25° C. (JIS K 6251: 2017).

As used herein, the term "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States (That is, the "rim" above includes current sizes as well as future sizes to be listed in the aforementioned industrial standards. An example of the "size as described in the future" could be the sizes listed as "FUTURE DEVELOPMENTS" in the ETRTO 2013 edition). For sizes not listed in the above industrial standards, the term "applicable rim" refers to a rim with a width corresponding to the bead width of the pneumatic tire. Further, the "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the "prescribed internal pressure" refers to the air pressure (maximum air pressure) corresponding to the maximum load capacity specified for each vehicle in which the tire is mounted.

Further, the "standard" for the tire maximum width shall mean the industrial standard in effect for the region in which the above tires are produced and used.

Furthermore, the "bead baseline" shall mean a hypothetical line passing through the bead base and parallel to the tire width direction in the above reference condition.

Advantageous Effect

According to this disclosure, it is possible to provide a run flat tire with run flat durability, while reducing the deterioration in ride comfort.

DETAILED DESCRIPTION

Figure 1:
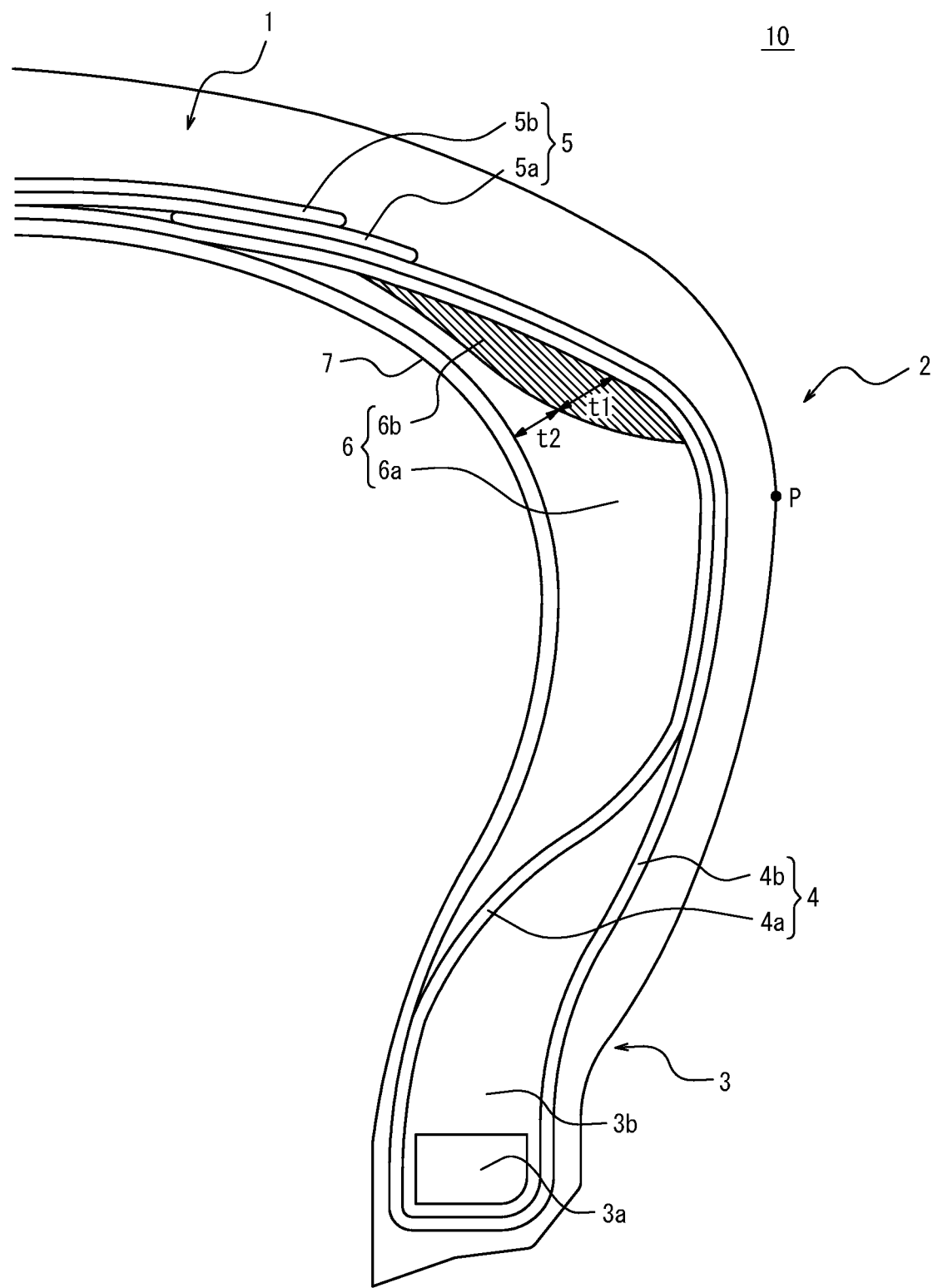
FIG. 1 is a partial cross-sectional view in the tire width direction of a run flat tire according to one embodiment of this disclosure.

FIG. 1 is a partial cross-sectional view in the tire width direction of a run flat tire according to one embodiment of this disclosure. FIG. 1 illustrates the cross-section in the tire width direction of the run flat tire, in the aforementioned reference condition.

As illustrated in FIG. 1, this run flat tire (hereinafter, referred to simply as "tire") 10 comprises a tread portion 1 comprising a tread rubber, sidewall portions 2 comprising a pair of sidewall rubbers connected to both sides of the tread portion 1, bead portions 3 connected to each sidewall portions 2.

As illustrated in FIG. 1, each bead portion 3 has a bead core 3a embedded therein. In this example, the bead filler 3b is disposed on the outer side of the bead core 3a in the tire radial direction.

The tire 1 further comprises a carcass 4 consisting of one or more carcass plies that straddle toroidally between a pair of bead portions 3. The carcass ply is made of organic fiber cords in this example. The carcass 4 includes a carcass body portion 4a, which is fastened to the bead core, and a carcass fold portion 4b, which extends from the carcass body portion 4a and is folded around the bead core 3a. In the illustrated example, the carcass fold portion 4b extends to the inner side in the tire width direction beyond the belt edge and terminates, which is the so-called envelope structure. However, not limited to this example, the end of the carcass fold portion 4b may be located, for example, on the inner side in the tire radial direction of the tire maximum width position.

Further, a belt 5 comprising one or more belt layers 5a and 5b (two layers in the illustrated example) is disposed outer side in the tire radial direction of the crown of the carcass 4. The belt cords of the two belt layers extend across each other between the layers, and the belt cords can extend, for example, at an angle of 30 to 60 degrees with respect to the tire circumferential direction. The belt cords are steel cords in this example.

In this tire 1, in the above reference condition, the tire maximum width is the central value or more and the upper limit or less of the tire maximum width specified in the standard. For example, when the value between the center value and the upper limit is the middle value, the tire maximum width can be the center value or more and the middle value or less, or it can be the middle value or more and the upper limit or less.

Further in this tire 1, the tire maximum width position in the above reference condition is located at the position, with a distance of more than 50% of the tire cross-sectional height, outward in the tire radial direction from the bead baseline. The tire maximum width position in the above reference condition may be located at the position, with a distance of more than 50% of the tire cross-sectional height, outward in the tire radial direction from the bead baseline, and be located at the position, with a distance of 60% or less than 60% of the tire cross-sectional height, outward in the tire radial direction from the bead baseline. Alternatively, the tire maximum width position in the above reference condition may be located at the position, with a distance of more than 60% the tire cross-sectional, outward height in the tire radial direction from the bead baseline.

As illustrated in the figure, the carcass line is roughly in line with the profile of the tire outer surface.

This tire 1 comprises a side-reinforcing rubber having a crescent-shaped cross section 6 in the sidewall portion 2. By disposing such side-reinforcing rubber 6, the side-reinforcing rubber 6 which contributes to supporting the weight of the vehicle body allows the vehicle to travel safely for a certain distance even when the internal pressure of the tire has decreased due to a flat tire or other reasons. In the illustrated example, in the cross section in the tire width direction, the side-reinforcing rubber 6 has a shape in which the thickness thereof in the tire width direction gradually decreases from around the center of the side-reinforcing rubber 6 toward the inside and outside of the same, and protrudes convexly outward in the tire width direction.

Here, in the tire according to this embodiment, a part of the side-reinforcing rubber 6 is a low elastic portion 6b with a lower elastic modulus than the other portion 6a. More specifically, the elastic modulus of the low elastic portion 6b is 80% or less of the elastic modulus of the other portion 6a. Preferably the elastic modulus of the low elastic portion 6b is 50% or less of the elastic modulus of the other portion 6a. More preferably the elastic modulus of the low elastic portion 6b is 20% or less of the elastic modulus of the other portion 6a.

The low elastic portion 6b is located in an area, in the tire radial direction, of 50% or more and 80% or less of the tire cross-sectional height from the bead baseline in the above reference condition. In the illustrated example, the low elastic portion 6b (all or part of the low elastic portion 6b) is located outer side in the tire width direction than the other portion 6a in the area in the tire radial direction of 50% or more and 80% or less of the tire cross-sectional height from the bead baseline. In the illustrated example, only the other portion 6a above is located at the tire radial position that corresponds to the tire maximum width position (the above low elastic portion 6b does not intersect a line parallel to the tire width direction passing through the tire maximum width position).

In addition, when the maximum thickness of the low elastic portion 6b, measured in the direction of a perpendicular line from the carcass 4 down to the tire inner surface, is t1 and the thickness of the other portion 6a, measured in the direction of that perpendicular line, is t2, the ratio t1/t2 is 0.2 or more and 3 or less (more preferably 0.5 or more and 1.5 or less). In the illustrated example, the point, having a maximum thickness measured in the direction of the perpendicular line, of the low elastic portion 6b is located near the center along the carcass 4, but this is not limited to this case.

The following is a description of the effects of the run flat tire according to this embodiment.

The inventors have studied the above problem and focused on the contribution of the side-reinforcing rubber to load support of run flat tires during normal driving and run flat driving, respectively. As a result, they found that the contribution of the buttress portion to load support is larger during normal driving than run-flat driving, and that the above problem can be advantageously solved by moderately reducing the bending rigidity of the buttress portion.

That is, first, by providing the low elastic portion 6b in an area, in the tire radial direction, of 50% or more and 80% or less of the tire cross-sectional height from the bead baseline in the above reference condition, since the contribution to load support in this area is relatively large during normal driving, lowering the elastic modulus of the low elastic portion 6b can reduces the vertical spring coefficient, thereby improving ride comfort. On the other hand, since the contribution to load support in this area is relatively small during run-flat driving, the reduction in durability during run-flat driving caused by the low elastic modulus of the low elastic portion 6b can be prevented. Here, if the elastic modulus of the low elastic portion 6b is more than 80% of that of the other portion 6a, the effect of improving ride comfort during normal driving cannot be fully achieved. Also, if the above ratio t1/t2 is less than 0.2, the effect of improving ride comfort during normal driving cannot be fully obtained. On the other hand, if the above ratio t1/t2 is greater than 3, durability during run-flat driving may decrease. In addition, even if a portion of the side-reinforcing rubber 6 is made to have low-modulus, it does not increase weight and thus does not impair fuel economy.

Further, by the tire maximum width in the above reference condition being the center value or more and the upper limit or less of the tire maximum width specified in the standard, and by the tire maximum width position in the above reference condition being located at the position, with a distance of more than 50% of the tire cross-sectional height, outward in the tire radial direction from the bead baseline, the radius of curvature of the carcass line in the buttress portion can be reduced, thereby reducing the tension of the carcass ply and reducing the bending rigidity of the buttress portion. This can further reduce the loss of ride comfort.

As described above, according to the run flat tire of this embodiment, by reducing the tension of the carcass ply and the elastic modulus of the side-reinforcing rubber in the buttress portion, the bending rigidity of the buttress portion can be moderately reduced to ensure run-flat durability, while reducing the decrease in fuel economy and ride comfort.

Here, the low elastic portion 6b is preferably located outer side in the tire width direction than the other portion 6a in the area in the tire radial direction of 50% or more and 80% or less of the tire cross-sectional height from the bead baseline. This is because it is possible to prevent rim dislodging during run-flat driving.

Preferably, only the other portion 6a is located at the tire radial position that corresponds to the tire maximum width position. This is because the tire maximum width position contributes significantly to load support during run-flat driving, thus further ensuring durability during run-flat driving.

The elastic modulus of the low elastic portion 6b is preferably 50% or less than that of the elastic modulus of the other portion 6a, and is more preferably 20% or less. This is because it can further improve ride comfort during normal driving.

Figure 2:
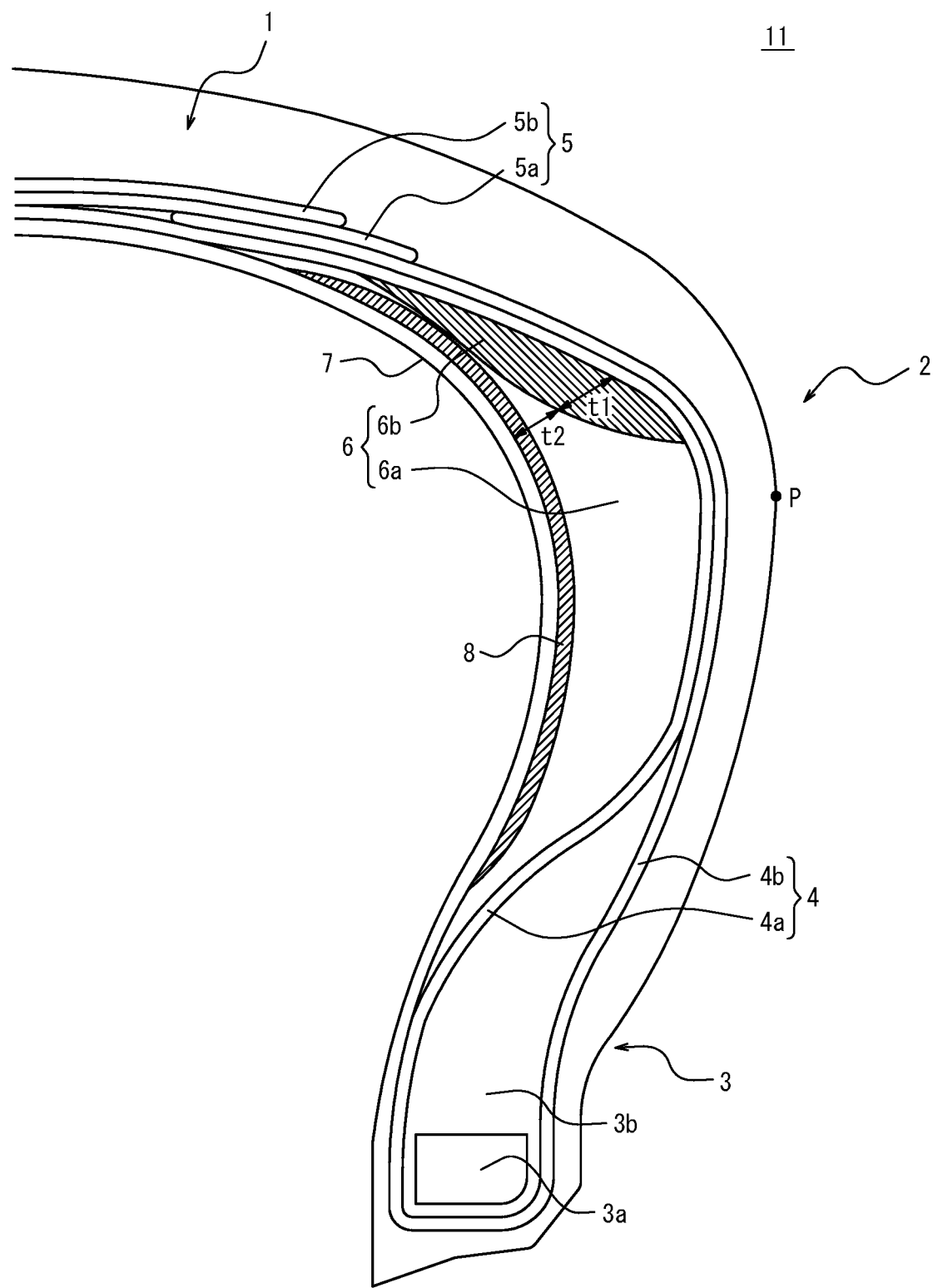
FIG. 2 is a partial cross-sectional view in the tire width direction of a run flat tire according to another embodiment of this disclosure.

FIG. 2 illustrates a partial cross-sectional view in the tire width direction of a run flat tire according to another embodiment of this disclosure. As illustrated in FIG. 2, the tire 11 according to this embodiment comprises an inner liner 7 on the tire inner surface. In this example, the inner liner 7 is made of butyl rubber. In this tire 1, the inner layer rubber 8 is disposed between the side-reinforcing rubber 6 and the inner liner 7. In the illustrated example, the inner layer rubber 8 is located over the entire area where the side-reinforcing rubber 6 and the inner liner 7 are adjacent to each other. In accordance with JIS K6270:2001, when the dumbbell-shaped No. 8 specimens having 1 mm notch in a direction perpendicular to the direction of repeated tension at the center thereof are subjected to repeated tension at a frequency of 10 Hz under the conditions of 150° C., the number of repetitions until the specimen of the inner layer rubber fails is, in the range of 10% to 30% of the tensile strain applied, at least twice that of the side-reinforcing rubber. In terms of material, the inner layer rubber 8 is made of rubber that does not contain copolymers of isobutylene and isoprene. The explanation of the other configurations is omitted since they are similar to those in FIG. 1 except for the placement of the inner layer rubber 8.

Here, the ratio of the elastic modulus of the inner layer rubber 8 to the elastic modulus of the other portion 6a of the side-reinforcing rubber 6 is 0.75 or less (preferably, 0.6 or less).

Further, in the reference condition, the ratio, to the maximum thickness of the side-reinforcing rubber 6 (consisting of only the other portion 6a, or the other portion 6a and the low elastic portion 6b) measured in the direction of a perpendicular line from the carcass 4 down to the tire inner surface, of the thickness of the inner layer rubber 8 measured in the direction of that perpendicular line is 0.05 to 0.30.

The inner layer rubber 8 has a high crack resistance. Because, in accordance with JIS K6270:2001, when the dumbbell-shaped No. 8 specimens having 1 mm notch in a direction perpendicular to the direction of repeated tension at the center thereof are subjected to repeated tension at a frequency of 10 Hz under the conditions of 150° ° C., the number of repetitions until the specimen of the inner layer rubber fails is, in the range of 10% to 30% of the tensile strain applied, at least twice (preferably, at least 10 times) that of the side-reinforcing rubber. The innermost part of the side-reinforcing rubber is subject to high temperature and high strain due to large deflection during run-flat driving. This configuration can suppress the generation and propagation of cracks from the inner surface of the tire, thereby enhancing the fracture resistance characteristics of the side-reinforcing rubber during run-flat driving and further improving the run-flat durability. In particular, reducing the volume of the side-reinforcing rubber 6 to the extent that the inner layer rubber 8 is disposed is preferable from the standpoint of controlling the increase in tire weight.

Further, the inner layer rubber 8 is made of rubber that does not contain copolymers of isobutylene and isoprene (e.g., rubber blended with butadiene rubber and natural rubber), therefore it has higher adhesiveness with side-reinforcing rubber 6 and inner liner 7 compared to butyl rubber, etc., and is less likely to delaminate from side-reinforcing rubber 6 and inner liner 7 even during run-flat driving, which is subject to high temperatures and large compression strain. Therefore, the side-reinforcing rubber 6 and the inner liner 7 can remain bonded through the inner layer rubber 8. This prevents a decrease in load bearing capacity due to a decrease in bending rigidity of the sidewall portion 2 caused by the separation of the side-reinforcing rubber 6 from the inner liner 7.

Furthermore, the inner layer rubber 8 as described above, in contrast to butyl rubber, etc., is less likely to crack, and thus less likely to form a nucleus of cracks that could propagate to the side-reinforcing rubber 6, and since cracks in the inner liner 7 are less likely to propagate to the inner layer rubber 8, the propagation of cracks from the inner liner 7 to the side-reinforcing rubber 6 can also be prevented. This also prevents the load bearing capacity from deteriorating due to cracks in the side-reinforcing rubber 6, which plays a role in load bearing during run-flat driving.

In addition, the ratio of the elastic modulus of the inner layer rubber 8 to the elastic modulus of other portions 6a of the side-reinforcing rubber 6 is 0.75 or less, so that the ride comfort during normal driving is not reduced.

In the above reference condition, the ratio, to the maximum thickness of the side-reinforcing rubber 6 measured in the direction of a perpendicular line from the carcass 4 down to the tire inner surface, of the thickness of the inner layer rubber 8 measured in the direction of that perpendicular line is 0.05 or more, so the above effect of preventing the load bearing capacity from deteriorating can be more effectively achieved.

On the other hand, in the above reference condition, the ratio, to the maximum thickness of the side-reinforcing rubber 6 measured in the direction of a perpendicular line from the carcass 4 down to the tire inner surface, of the thickness of the inner layer rubber 8 measured in the direction of that perpendicular line is 0.30 or less, so the weight increase due to the addition of the inner layer rubber 8 can be minimized.

EXAMPLES

Examples

In order to verify the effectiveness of this disclosure, the test was conducted to evaluate tire performance by building prototypes of tires for the Example and Comparative example with tire size PSR 235/40R19.

Comparative example: The side-reinforcing rubber was made of one type of rubber. The tire maximum width position of the mold was located at the position, with a distance of 48% of the tire cross-sectional height, outward in the tire radial direction from the bead baseline. The maximum width of the mold was less than the center value of the maximum tire width specified in the standard.

Example: The maximum width of the mold (corresponding to the tire maximum width) was 11.4 mm larger than in the Comparative example. It is between the center value and the upper limit of the tire maximum width specified in the standard. The tire maximum width position of the mold was located at the position, with a distance of 52% of the tire cross-sectional height, outward in the tire radial direction from the bead baseline. The low elastic portion with an elastic modulus of 75% of that of the side-reinforcing rubber is disposed in the tire radial direction in the range of 61% to 73% of the tire cross-sectional height from the bead baseline, and the ratio of the gauge of the low elastic portion to the rubber gauge of the rest of the rubber portion, at the thickest part of the gauge of the low elastic portion, was arranged to be 0.5. Others are the same as in the Comparative example. Further, the inner layer rubber, which has an elastic modulus of 31% of that of the side-reinforcing rubber, is arranged so that the ratio of the gauge of the inner layer rubber to that of the side-reinforcing rubber is 0.14 at the thickest part of the side-reinforcing rubber gauge. Other configurations are the same as in the Comparative example.

<Run Flat Durability>

The run-flat durability was evaluated under the rim, internal pressure, and load conditions in accordance with ISO standards. The results are expressed as an index with the result of the Comparative example set at 100, with a larger index indicating better performance.

<Vertical Spring Coefficient>

The vertical spring coefficient was calculated when the tire was rimmed on a JATMA compliant rim, filled with an internal pressure of 230 kPa, and loaded with a load of 4320 N. The results are expressed as an index with the result of the Comparative example set at 100, with a smaller index indicating better performance.

The evaluation results are shown in Table 1 below.

TABLE 1

| | Comparative Example | Example |
|---|---|---|
| FIG. | — | FIG. 2 |
| Run flat durability (INDEX) | 100 | 100 |
| Vertical spring coefficient (INDEX) | 100 | 91.7 |

REFERENCE SIGNS LIST

10 Run flat tire
11 Run flat tire
1 Tread portion
2 Sidewall portion
3 Bead portion
4 Carcass
5 Belt
6 Side-reinforcing rubber
7 Inner liner
8 Inner layer rubber

The invention claimed is:

1. A run flat tire comprising:
   a tread portion;
   a pair of sidewall portions connected to both sides of said tread portion;
   bead portions connected to each of said sidewall portions;
   a side-reinforcing rubber having a crescent-shaped cross section disposed in said sidewall portion; and
   a carcass straddling toroidally between a pair of said bead portions, the carcass having a carcass body portion, which is fastened to a bead core, and a carcass fold portion, which extends from the carcass body portion and is folded around the bead core; wherein,
   said side-reinforcing rubber-is a consists of only one low elastic portion and an other portion, the low elastic portion extending between an outer end and an inner end in the tire radial direction and having a lower elastic modulus than the other portion,
   said outer and inner ends of said low elastic portion are disposed along the carcass body portion and located in an area, in the tire radial direction, of 50% or more and 80% or less of the tire cross-sectional height from the bead baseline, in a reference condition with said run flat tire mounted on an applicable rim, filled with prescribed internal pressure, and unloaded,
   an elastic modulus of said low elastic portion is 80% or less of an elastic modulus of said other portion,
   when a maximum thickness of said low elastic portion, measured in the direction of a perpendicular line from said carcass down to a tire inner surface, is t1 and a thickness of said other portion, measured in the direction of said perpendicular line, is t2, the ratio t1/t2 is 0.2 or more and 3 or less,
   a tire maximum width in said reference condition is a center value or more and a upper limit or less of the tire maximum width associated with a given rim construction, and
   a tire maximum width position in said reference condition is located at the position, with a distance of more than 50% of the tire cross-sectional height, outward in the tire radial direction from the bead baseline.

2. The run flat tire according to claim 1, comprising,
   an inner liner on the tire inner surface, and
   an inner layer rubber disposed between said side-reinforcing rubber and said inner liner, and
   in accordance with JIS K6270: 2001, when the dumbbell-shaped No. 8 specimens having 1 mm notch in a direction perpendicular to the direction of repeated tension at the center thereof are subjected to repeated tension at a frequency of 10 Hz under the conditions of 150° C., the number of repetitions until the specimen of said inner layer rubber fails is, in the range of 10% to 30% of the tensile strain applied, at least twice that of the side-reinforcing rubber.

3. The run flat tire according to claim 2, wherein the ratio of the elastic modulus of said inner layer rubber to the elastic modulus of said other portion of said side-reinforcing rubber is 0.75 or less.

4. The run flat tire according to claim 3, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

5. The run flat tire according to claim 2, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

6. The run flat tire according to claim 2, comprising,
an inner liner on the tire inner surface, and
an inner layer rubber disposed between said side-reinforcing rubber and said inner liner, and
said inner layer rubber is made of rubber that does not contain copolymers of isobutylene and isoprene.

7. The run flat tire according to claim 6, wherein the ratio of the elastic modulus of said inner layer rubber to the elastic modulus of said other portion of said side-reinforcing rubber is 0.75 or less.

8. The run flat tire according to claim 7, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

9. The run flat tire according to claim 6, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

10. The run flat tire according to claim 1, comprising,
an inner liner on the tire inner surface, and
an inner layer rubber disposed between said side-reinforcing rubber and said inner liner, and
said inner layer rubber is made of rubber that does not contain copolymers of isobutylene and isoprene.

11. The run flat tire according to claim 10, wherein the ratio of the elastic modulus of said inner layer rubber to the elastic modulus of said other portion of said side-reinforcing rubber is 0.75 or less.

12. The run flat tire according to claim 11, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

13. The run flat tire according to claim 10, wherein, in the reference condition, the ratio of the thickness of said inner layer rubber when measured in the direction of said perpendicular line to the maximum thickness of said side-reinforcing rubber when measured in the direction of said perpendicular line is 0.05 to 0.30.

* * * * *